United States Patent [19]
Glassmeyer

[11] 3,880,403
[45] Apr. 29, 1975

[54] TRAILER PROP OPERATING STRUCTURE

[75] Inventor: John J. Glassmeyer, Covington, Ky.

[73] Assignee: Pullman Incorporated, Chicago, Ill.

[22] Filed: Feb. 13, 1974

[21] Appl. No.: 442,011

[52] U.S. Cl. ............................ 254/86 R; 280/150.5
[51] Int. Cl. ............................................. B60s 9/02
[58] Field of Search ........ 254/86 R, 98; 74/424.8 R, 74/459; 280/150.5, 15 A

[56] References Cited
UNITED STATES PATENTS
2,674,438   4/1954   Dalton ............................. 254/86 R
2,874,877   2/1959   Spencer .......................... 74/424.8 R Primary Examiner—Donald G. Kelly
Assistant Examiner—Robert C. Watson
Attorney, Agent, or Firm—Richard J. Myers

[57] ABSTRACT

In a trailer prop, a combination of a jackscrew and a nut for raising and lowering of the prop including an immovable vertically extending helical type jackscrew having a double start screw structure with a pair of screw elements, each screw element having a lower downward facing prop lifting face being directed inwardly generally perpendicular to and toward the vertical axis of the screw to provide for efficient lifting work by the jackscrew by engagement with a complementary upward facing first nut thread face, each screw element having an upper upward facing prop retracting face at far less than ninety degrees with the vertical axis of the screw to eliminate the tendency to overhaul or vibrate down when engaging with a complementary downward facing second nut thread face, the distance between the lower and upper faces of the screw being less than the distance between the first and second nut thread faces to provide a clearance space between the non-engaging faces of the nut and screw.

8 Claims, 7 Drawing Figures

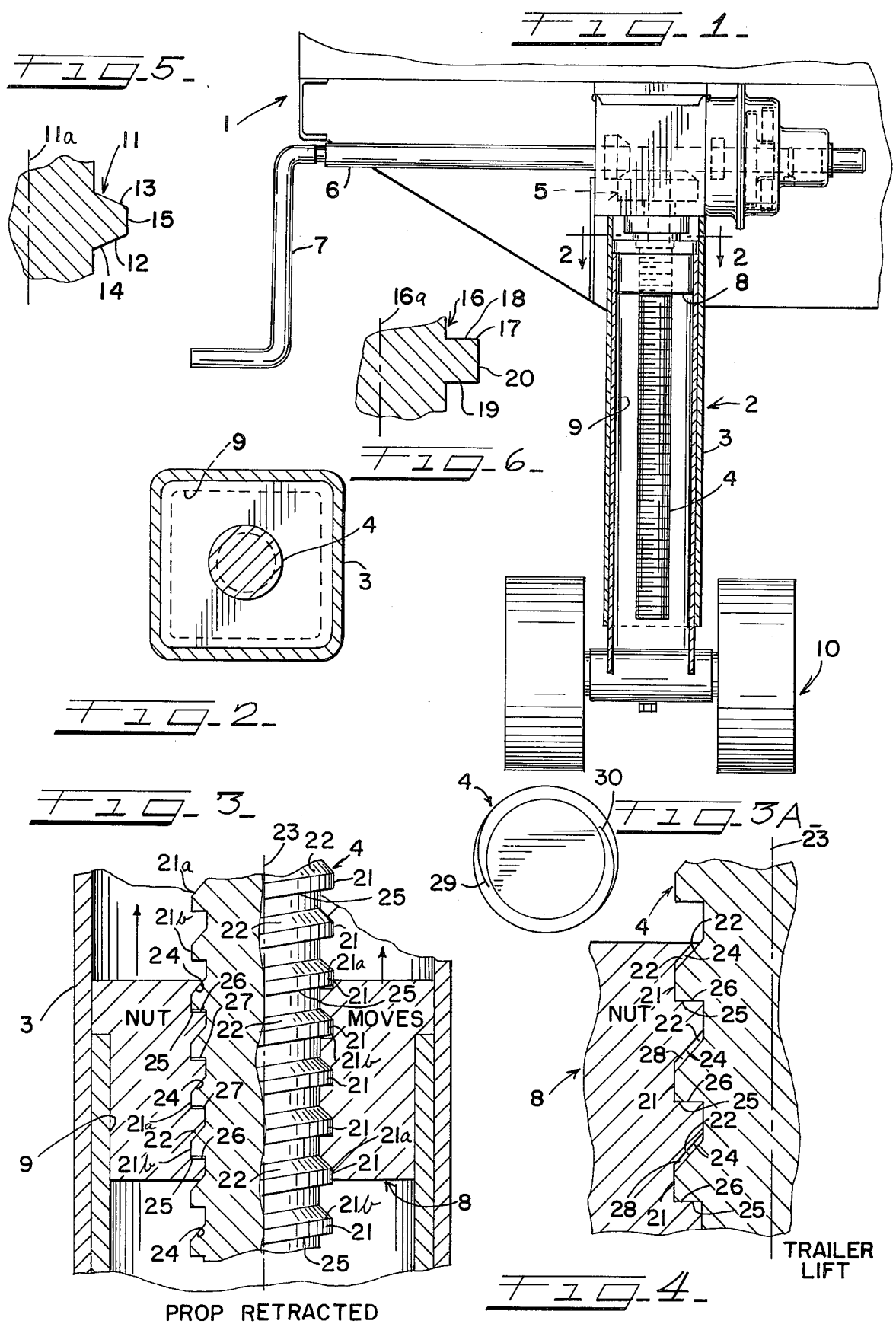

TRAILER PROP OPERATING STRUCTURE

BACKGROUND OF THE INVENTION

1. Field of the Invention:

This invention relates to the field of highway trailer props or landing gears and in particular to the trailer landing gear types employing a jackscrew and nut arrangement for lifting of the trailer front end or retracting the landing gear into the out of use position by operation of a crank handle on the trailer.

2. Description of the Prior Art:

It is heretofore known to employ the jackscrew and nut type of trailer prop retracting and lifting arrangement as shown for instance by U.S. Pat. Nos. 3,033,522; 3,489,395; and 3,596,877. Trailer landing gears or props, in fact, in common use today utilize jackscrews having threads machined to conform to either the Acme thread form or the square or modified square thread form. The efficiency of a screw used for translation of a force increases as the angle which the side faces (that engage the side faces of the associated nut) of the thread make with the axis of the screw approaches 90°. A second factor affecting the efficiency of the screw is the helix angle of the screw. A four pitch thread, for instance, is more efficient than a six pitch thread. The steeper the helix angle, the more efficient. For this reason double start screw threads are used in trailer landing gears. Yet it is desirous to provide a jackscrew that is very efficient in lifting operations but not efficient in retraction so as to eliminate the tendency to overhaul or vibrate (jiggle) down. This is what the instant invention purports to do.

SUMMARY OF THE INVENTION

It is a general object of this invention to provide for an improved landing gear or prop arrangement for highway trailers.

It is a further object of this invention to provide for an improved thread arrangement for the jackscrew of a nut and jackscrew drive for a highway trailer landing gear.

Another object is to provide for a jackscrew side face in contact with the nut face of the trailer prop during trailer prop lifting that can be machined or made perpendicular to the axis of the screw whereby the lifting efficiency of the screw is greatly improved, thereby reducing the work required by the operator to raise a heavy loaded trailer.

It is a further object of this invention to provide that the trailer prop jackscrew side face in contact with the nut when the landing gear legs are retracted, is made or machined at an angle far less than 90° to the axis of the screw. The screw efficiency in this situation is considerably reduced which eliminates the tendency to overhaul or to vibrate down.

It is a further object of the invention to provide for a jackscrew and nut arrangement, as discussed above, which is more resistant to stripping under heavy loads or under impact conditions.

These and other objects, advantages and purposes will become apparent from reference to the following description, appended claims and attached drawings.

BRIEF DESCRIPTION OF THE DRAWINGS

FIG. 1 is a partial view of a highway trailer illustrating a sectional view of a landing gear or prop;

FIG. 2 is a cross-sectional view taken along line 2—2 of FIG. 1;

FIG. 3 is an enlarged partial vertical sectional view of the landing gear illustrating the cooperation between the novel constructed jackscrew and nut interlock of the trailer prop during retraction operation of the prop;

FIG. 3A is an end view of the trailer jackscrew shown in FIGS. 1 – 3 which jackscrew is of the double start screw thread type;

FIG. 4 is an enlarged partial vertical view illustrative of the cooperation between the trailer prop jackscrew and nut illustrated in FIGS. 1 – 3 and FIG. 3A but with the prop being placed in trailer prop lift operation;

FIG. 5 is an elevational partial view of a screw of the Acme thread type; and

FIG. 6 is an elevational partial view of a screw of the square or modified square type.

DESCRIPTION OF THE PREFERRED EMBODIMENT

With reference now to the drawings and in particular with reference to FIGS. 1 and 2, there is shown a partial view of a highway trailer 1 as for instance which is shown in U.S. Pat. No. 3,489,395 to J. Glassmeyer which is hereby incorporated herein by reference thereto. The trailer is provided with a landing gear or prop 2 of the jackscrew and nut type. The prop includes an outer telescope tube or part 3 that is fixed or immobile and carries a vertically fixed but rotatable jackscrew 4 that is rotated by gears 5 through rotation of shaft 6 and crank handle 7. A nut 8 is about the jackscrew 4. When the handle is cranked one way the nut is moved up along the jackscrew (see FIG. 3) and when the handle 7 is cranked the other way the nut 8 is moved the opposite way along the jackscrew, or down, and the trailer is lifted (see FIG. 4). This is because the inner telescope tube 9 is fixedly attached to the nut 8 and as the nut 8 moves so does the tube 9 to which the landing gear wheels 10 are attached. This type of construction and operation is conventional.

The invention more clearly resides in the construction of the jackscrew and nut for lifting (FIG. 4) the trailer or for retracting of the prop into an out-of-use position within the trailer when the trailer is being pulled by a tractor or cab on the highway and to this end attention is directed to a novel jackscrew and nut construction shown in FIGS. 3, 3A and 4 as distinguished from the prior art jackscrew arrangement of an Acme thread (FIG. 5) or the square or modified square thread (FIG. 6). The Acme thread screw 11 has a vertical axis 11a and the thread portion 12 projects outward therefrom and is provided with a generally horizontal but sloped topside face 13 and a generally horizontal but sloped bottomside face 14 and a vertical, end or crest side 15. The top and bottom faces 13 and 14 are at acute angles with a horizontal axis or a non-perpendicular angle with the vertical axis. The square thread screw 16 has a vertical axis 16a and a thread portion 17 projects outward therefrom and is provided with a horizontal (very little slope if any) top face 18 and a horizontal bottom face (very little if any slope) 19. The top and bottom faces are perpendicular to the vertical axis 16a and the screw 16 is provided with a vertical side face or crest 20.

With reference now to FIGS. 3, 3A and 4 there is shown the novel jackscrew 4 and nut 8. The jackscrew 4 (as well as the nut) has threads of the helical type, which threads 21 go up in a helical pattern, there being a certain number of vertically arranged threads per unit of measurement as determined by the helix angle, a four pitch thread (four threads to the inch) being more efficient in work effort than a six pitch thread; the steeper the helix angle the more efficient work load-wise is the screw. The jackscrew 4 is provided with a top upwardly and inwardly sloped face 22 to the horizontal. This topside face 22 is machined at an angle far less than 90° to the vertical axis 23 of the screw 4. The screw efficiency (work output to work input) of face 22 is considerably reduced or very inefficient which situation eliminates the tendency of the screw to overhaul or to vibrate (jiggle) down. The top side face 22 of the jackscrew 4 is in contact with the underside face 24 of the nut 8 when the prop or the landing gear legs are retracted and the horizontal lower or underside face 25 of the jackscrew is spaced away from nut top horizontal face 26 by a tolerance or clearance space 27. The jackscrew underside face 25 in contact with the nut face 26 during trailer lifting, is machined approximately perpendicular to the vertical axis of the screw and this increases the efficiency, thereby reducing the work required to raise a heavily loaded trailer. However, the underside face 25 of the jackscrew may vary substantially between 1 and 10° from the horizontal. The surfaces 22 and 24 under such lifting conditions are separated to define a clearance space 28. The other jackscrew surface 22 in practice is approximately between 10 and 45° from the horizontal or substantially less than 90° therefrom. The maximum efficiency for lifting is a horizontal surface for the surface 25. By doubling the number of starts of the screw this increases (makes steeper) the helix angle and this increases the efficiency of the screw. There is shown in FIG. 3A a double start screw thread arrangement in a trailer landing gear where 29 indicates the first start of a first thread and 30 indicates the second start of a second thread. Thus the threads 21 are double so that every other thread 21 started at 29 is a thread 21a and every adjacent thread 21 started at 30 is a thread 21b (see FIG. 3). A double start thread is about double the efficiency of a single start. Using a double start screw one can, therefore, get increased efficiency with the novel jackscrew 4 and nut 8 without the high efficiency acting against the screw operation which would permit jiggling because sloped jackscrew surface 22 (FIG. 3) is bearing against nut slope surface 24. In lift (FIG. 4) jackscrew surface 25 abuts against nut surface 26 for high efficiency and easy strong lifting.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In a trailer prop, a jackscrew and a nut arrangement for raising and lowering the prop comprising:
   an immovable vertically extending jackscrew having thread means, said thread means of said jackscrew being of double start thread construction including a pair of vertically alternating helical thread elements, each thread element having a downward facing lower thread face being directed inwardly generally perpendicular to the vertical axis of the jackscrew,
   a nut on the jackscrew having thread means having an upward facing thread face complemental to and for engagement with said lower thread face of each thread element of said jackscrew for lifting the prop,
   each thread element of said jackscrew having an upward facing upper thread face at less than 90° to the vertical axis of the jackscrew and directed upwardly in sloping fashion toward the vertical axis of the jackscrew, and
   said thread means of said nut having a downward facing thread face complemental to and for engagement with said upper thread face of each thread element of said jackscrew for retracting the prop and to eliminate downward jiggling of the nut on the jackscrew.

2. The invention according to claim 1, and said lower thread face of said jackscrew being disposed between 1° and 10° from the horizontal.

3. The invention according to claim 1, and said upper thread face of said jackscrew being disposed between 10° and 45° from the horizontal.

4. The invention according to claim 1, and the vertical height of each thread element of said jackscrew being less than the vertical distance of the space between a pair of successive thread means of said nut receiving such thread element of said jackscrew to provide a clearance between one of the faces of each thread element of said jackscrew and said thread means of the nut when the other faces of each thread element of said jackscrew and said nut are in engagement with one another so as to aid in efficient lifting and retracting of the trailer prop.

5. The invention according to claim 1, and said lower face of said jackscrew being between substantially 1° and 10° from the horizontal and the upper face of said jackscrew being between substantially 10° and 45° from the horizontal.

6. The invention according to claim 5, and the vertical height of each thread element of said jackscrew being less than the vertical distance of the space between a pair of successive thread means of said nut receiving such thread element of said jackscrew to provide a clearance between one of the faces of each thread element of said jackscrew and the thread means of the nut when the other faces of each thread element of said jackscrew and the thread means of the nut are in engagement with one another to aid in efficient lifting and retracting of the trailer prop.

7. A telescoping trailer prop including a fixed outer telescoping part and a movable inner telescoping part comprising:
   a jackscrew fixed with the immobile telescoping part,
   a nut disposed about the jackscrew and fixed with the movable telescoping part,
   said jackscrew having thread means, said thread means of said jackscrew being of double start thread construction including a pair of vertically alternating helical thread elements, each thread element, including a downward facing lower thread face being directed generally perpendicular to the vertical axis of the jackscrew, said nut having thread means including a first nut face having contouring for complemental engagement with the lower face of each thread element of said jackscrew for moving the inner telescoping part outward for lifting the prop, each thread element of said jackscrew having an upward facing upper face at less than 90° to the vertical axis of the jackscrew and directed upwardly in sloping fashion toward the vertical axis of the jackscrew, said thread means of said nut including a second nut face having contouring for complemental engagement with the upper face of each thread element of said jackscrew for moving the inner telescoping part inward for retracting the jackscrew and to prevent downward jiggling of the inner telescoping part during the retraction thereof, and said lower face of each thread element of said jackscrew being between substantially 1° and 10° from the horizontal and the upper face of each thread element of said jackscrew being between substantially 10° and 45° from the horizontal.

8. The invention according to claim 7, and the vertical height of each thread element of said jackscrew being less than the vertical distance of the space between a pair of successive thread means of said nut receiving such thread element of said jackscrew to provide a clearance between one of the faces of each thread element of said jackscrew and the thread means of said nut when the other faces of each thread element of said jackscrew and the thread means of said nut are in engagement with one another to aid in efficient lifting and retracting of the trailer prop.

* * * * *